(12) United States Patent
Shaw et al.

(10) Patent No.: US 11,388,493 B1
(45) Date of Patent: Jul. 12, 2022

(54) SECURE AND ATTESTED ALL-PHOTONICS NETWORK

(71) Applicant: DELL PRODUCTS, LP, Round Rock, TX (US)

(72) Inventors: Rowland Shaw, Chester, NH (US); Qing Ye, Hopkinton, MA (US); Said Tabet, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/241,951

(22) Filed: Apr. 27, 2021

(51) Int. Cl.
*H04B 10/071* (2013.01)
*H04Q 11/00* (2006.01)

(52) U.S. Cl.
CPC ....... *H04Q 11/0066* (2013.01); *H04B 10/071* (2013.01); *H04Q 11/0067* (2013.01); *H04Q 2011/009* (2013.01); *H04Q 2011/0064* (2013.01); *H04Q 2011/0073* (2013.01); *H04Q 2011/0083* (2013.01); *H04Q 2213/13339* (2013.01); *H04Q 2213/13349* (2013.01)

(58) Field of Classification Search
CPC .................................................... H04B 10/071
See application file for complete search history.

(56) References Cited

U.S. PATENT DOCUMENTS

| 8,948,589 | B2 | 2/2015 | Smith et al. | |
|---|---|---|---|---|
| 9,673,897 | B2 | 6/2017 | Prause | |
| 2012/0014690 | A1* | 1/2012 | Gruber | H04B 10/07951 398/25 |
| 2016/0366586 | A1* | 12/2016 | Gross | H04L 63/0876 |
| 2020/0350986 | A1* | 11/2020 | Ahadian | H04B 10/07955 |
| 2022/0030030 | A1* | 1/2022 | Sofer | H04L 63/166 |

* cited by examiner

*Primary Examiner* — Shi K Li
(74) *Attorney, Agent, or Firm* — Larson Newman, LLP

(57) ABSTRACT

A data communication network includes a plurality of network nodes coupled together via optical links and a network controller. Each network node includes a reflectometry analyzer that provides a characterization of physical properties of the optical links coupled to the associated network node. The characterization for each particular optical link provides a unique fingerprint of the physical properties of the particular optical link. The network controller determines a network path between a first network node and a second network node, wherein the network path traverses a first optical link, receives a first fingerprint for the first optical link from a first reflectometry analyzer, defines a signature for the path, the signature including the first fingerprint, receives a second fingerprint for the first optical link from the first reflectometry analyzer, the second fingerprint being different from the first fingerprint, and determines that the network path is not secure based upon the difference between the first fingerprint and the second fingerprint.

20 Claims, 5 Drawing Sheets

SECURE AND ATTESTED ALL-PHOTONICS NETWORK

FIELD OF THE DISCLOSURE

This disclosure generally relates information handling systems, and more particularly relates to secure and attested all-photonics networking in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A data communication network may include a plurality of network nodes coupled together via optical links and a network controller. Each network node may include a reflectometry analyzer that provides a characterization of physical properties of the optical links coupled to the associated network node. The characterization for each particular optical link may provide a unique fingerprint of the physical properties of the particular optical link. The network controller may determine a network path between a first network node and a second network node, receive a first fingerprint for the first optical link from a first reflectometry analyzer, define a signature for the path, the signature including the first fingerprint, receive a second fingerprint for the first optical link from the first reflectometry analyzer, the second fingerprint being different from the first fingerprint, and determine that the network path is not secure based upon the difference between the first fingerprint and the second fingerprint.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
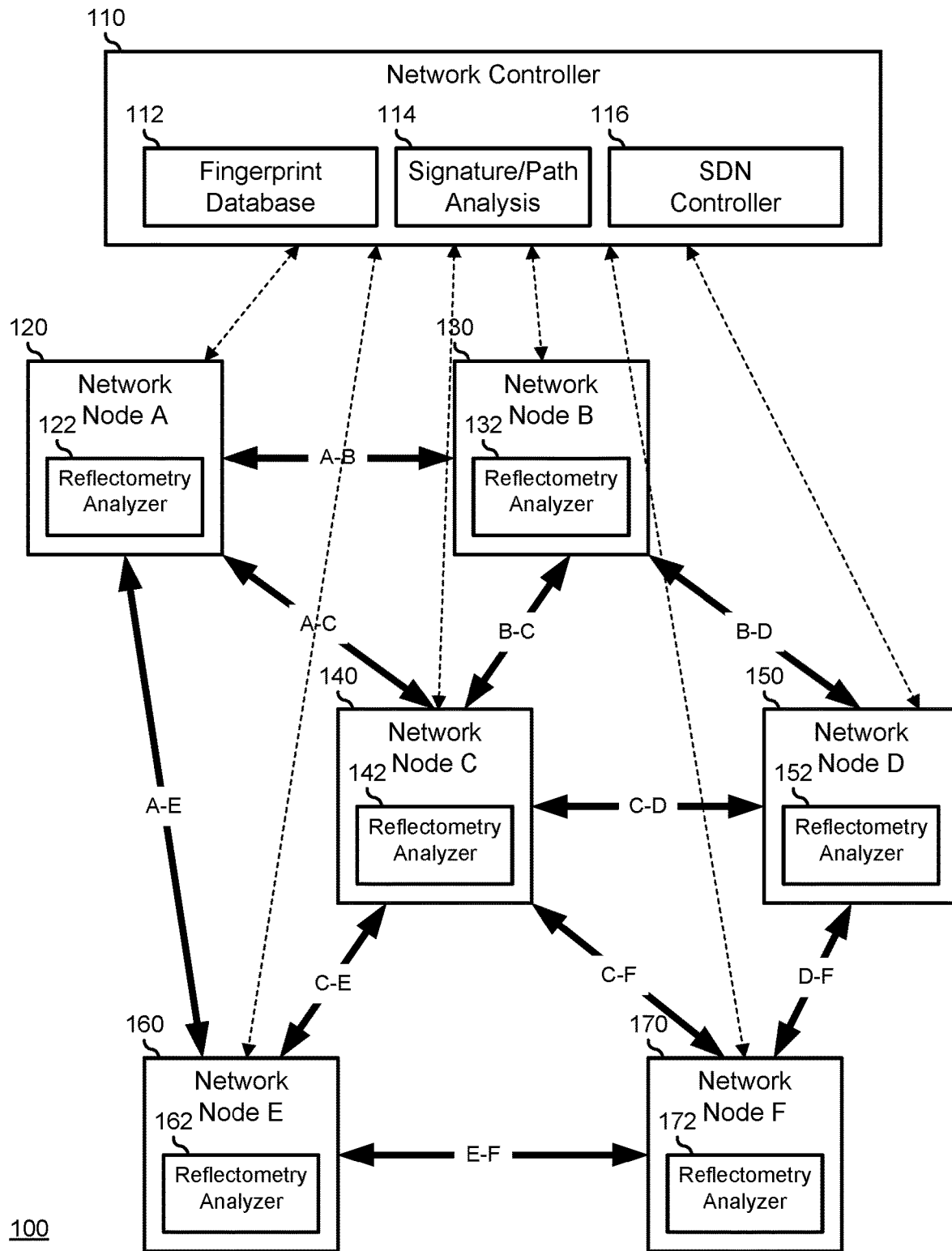
FIGS. 1-3 illustrate an all-photonics network according to an embodiment of the current disclosure.

FIG. 1 illustrates an all-photonics network 100 including a network controller 110 and network nodes 120, 130, 140, 150, 160, and 170. Network controller 110 includes a fingerprint database 112, a signature and path analysis module 114, and a Software Defined Network (SDN) controller 116. Nodes 120, 130, 140, 150, 160, and 170 each include respective reflectometry analyzers 122, 132, 142, 152, 162, and 172. All-photonics network 100 is characterized by the fact that the links between nodes 120, 130, 140, 150, 160, and 170 are all optical-based network links, such as where communications between the nodes is carried by fiber-optic links.

All-photonics network 100 may represent a regional network where the links between nodes 120, 130, 140, 150, 160, and 170 are single-mode fiber optic links that may include embedded repeaters as needed or desired, or may represent a more local network where the links between the nodes are multi-mode fiber optic links. One or more of nodes 120, 130, 140, 150, 160, and 170 may represent network routing and switching devices, where the data transmitted over all-photonics network 100 is received from and sent to other devices that utilize the data. For example, the data transmitted over all-photonics network 100 may represent data transmitted between different datacenters. One or more of nodes 120, 130, 140, 150, 160, and 170 may also represent data processing systems or have dedicated data processing capacities as needed or desired.

The data transmitted via all-photonics network 100 may be understood to be directed from a source node 120, 130, 140, 150, 160, or 170 to a target node, and may, under various routing protocols, such as a Border Gateway Protocol (BGP), an Open Shortest Path First (OSPF) protocol, an Intermediate System to Intermediate System (IS-IS) protocol, or the like, be directed via various routing paths and through different nodes in the all-photonics network, based upon the traffic volume, or other conditions on the all-photonics network, as needed or desired. As such, SDN controller 116 operates to manage the switching and routing functions of nodes 120, 130, 140, 150, 160, and 170 to ensure that all-photonics network 100 provides reliable data communication between the nodes. For example, SDN controller 116 and nodes 120, 130, 140, 150, 160, and 170 may implement an OpenFlow architecture to permit the remote management of the switching and routing functions of the nodes by the SDN controller.

Reflectometry analyzers 122, 132, 142, 152, 162, and 172 represent instruments associated with the links between nodes 120, 130, 140, 150, 160, and 170. In particular, reflectometry analyzers 122, 132, 142, 152, 162, and 172 operate to send test signals, modulated light pulses, down the links, to receive backscattered light from the links, and to analyze the backscattered light to determine the physical characteristics of the links. In a particular embodiment, for example where all-photonics network 100 represents a widely dispersed network that utilizes single mode optical fibers, reflectometry analyzers 122, 132, 142, 152, 162, and 172 may represent optical time domain reflectometry (OTDR) instruments that analyze the attenuation of the backscattered light from the links to determine the spatial location of discontinuities in the optical fibers. In another embodiment, for example where all-photonics network 100 represents a more closely spaced network that utilizes multi-mode optical fibers, reflectometry analyzers 122, 132, 142, 152, 162, and 172 may represent optical frequency domain reflectometry (OFDR) instruments that provide a swept frequency test signal to determine the spatial arrangement of strain, temperature, and other characteristics of the associated links. In yet another embodiment, reflectometry analyzers 122, 132, 142, 152, 162, and 172 may represent other types of instruments that collect reflected, refracted, scattered or other backward propagated light that functions to characterize the optical links from connector surfaces, splices, and other fiber impurities along the optical links, as needed or desired. Further, it will be understood that reflectometry analyzers 122, 132, 142, 152, 162, and 172 may represent separate instruments within respective nodes 120, 130, 140, 150, 160, and 170, or may be integrated with the respective nodes, as needed or desired. The details of reflectometry and of OFDR and OTDR instruments is known in the art, and will not be further described herein except as needed to illustrate the current embodiments.

It has been understood by the inventors of the current disclosure that reflectometry analysis instruments like reflectometry analyzers 122, 132, 142, 152, 162, and 172 are typically utilized in all-photonics networks when a new fiber optic cable is installed to characterize the fiber optic cable. If issues arise with the data transmission over that fiber optic cable, then the reflectometry analysis will be performed again. Then the newly determined characteristics for the particular fiber optic cable can be compared with the original characteristics to determine the nature and location of the issues in the fiber optic cable. It has been further understood that, for any particular fiber optic cable, the results of a reflectometry analysis will be unique to that particular fiber optic cable, and that no other fiber optic cable will display an identical reflectometry analysis result. For example, no two fiber optic cables will have splices, connectors, and imperfections at the exact spatial locations within the fiber optic cables as each other. As such, each fiber optic cable will demonstrate a unique reflectometry analysis result, like unto a fingerprint. Hence, each fiber optic cable will hereinafter be understood to have a unique reflectometry analysis fingerprint.

In a particular embodiment, reflectometry analyzers 122, 132, 142, 152, 162, and 172 operate to continuously monitor the associated optical links to generate a real time fingerprint for each optical link. For example, where a particular optical link represents a single mode fiber optic cable, the associated reflectometry analyzer 122, 132, 142, 152, 162, or 172 may operate to halt data transmission over that optical link for a short duration, and generate a reflectometry analysis fingerprint for that optical link, and then resume data transmission on that optical link. In another example, a sensing signal provided by reflectometry analyzers 122, 132, 142, 152, 162, and 172 may share optical links such that no interruption of the data transmission is necessary. The generation of the reflectometry analysis may be performed periodically, such as once per minute, hourly, daily, weekly, or on another periodic basis as needed or desired, so that the amount of time needed for generating the reflectometry analysis fingerprint is proportionally small.

In another example, where a particular optical link represents a multi-mode fiber optic cable, the associated reflectometry analyzer 122, 132, 142, 152, 162, or 172 may utilize a particular light frequency that is reserved for generating continuous reflectometry analysis fingerprints for that optical link. Here, any major changes in the fingerprints can be instantly detected and flagged for further analysis, as needed or desired. In either case, reflectometry analyzers 122, 132, 142, 152, 162, and 172 operate to communicate the fingerprints for each of the optical links to fingerprint database 112 for analysis by signature and path analysis module 114, as described below.

Figure 2:
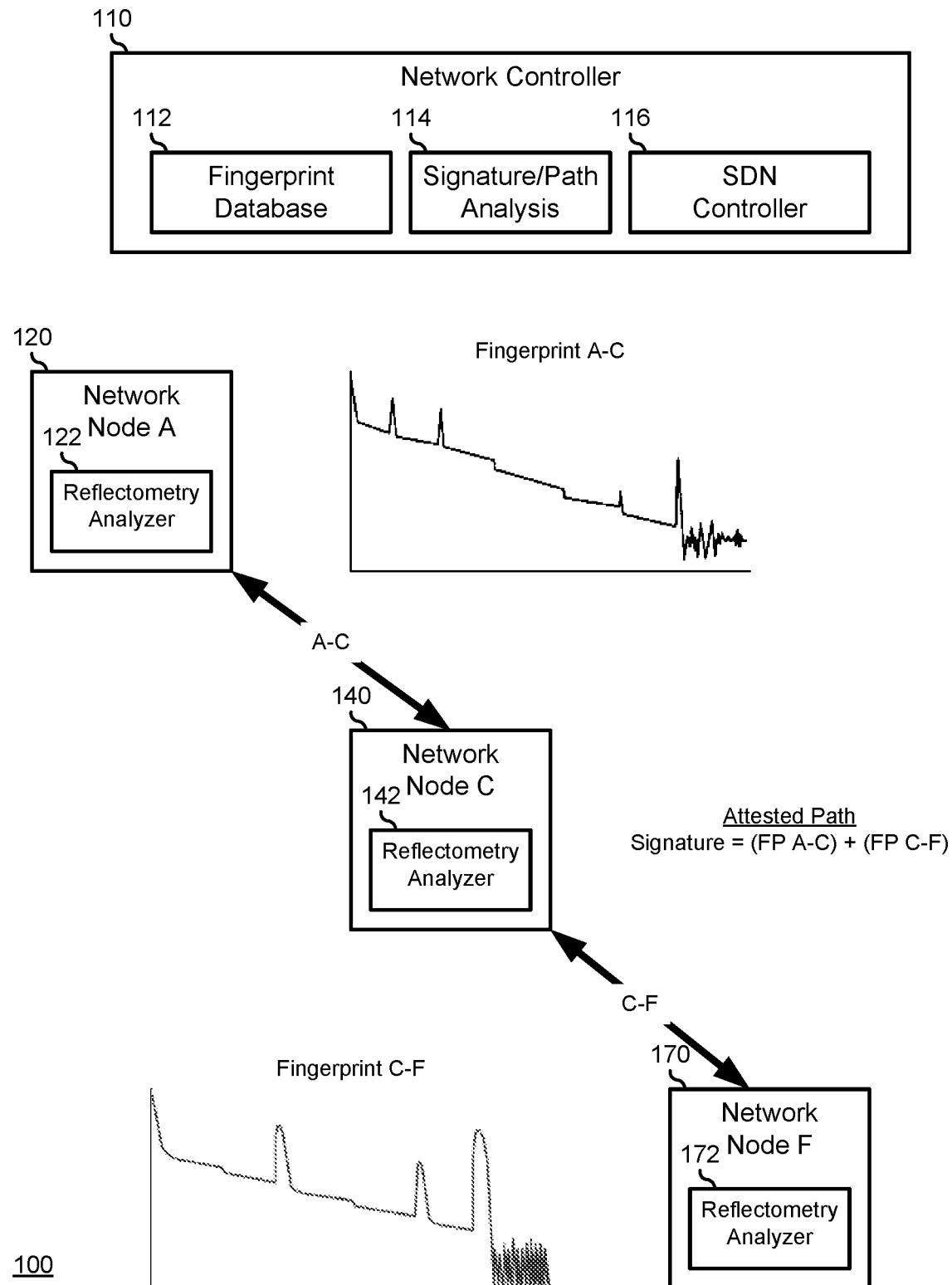

In a particular embodiment, all-photonics network 100 operates to provide validated end-to-end paths between nodes 120, 130, 140, 150, 160, and 170 based upon the fingerprints of the optical links between the nodes. For example, FIG. 2 illustrates all-photonics network 100 with a validated path between nodes 120 and 170, where the path includes the optical link between node 120 and node 140 (optical link A-C) and the optical link between node 140 and node 170 (optical link C-F). Here, reflectometry analyzer 122 provides a fingerprint (Fingerprint A-C) for the optical link from node 120 to node 140 to fingerprint database 112, and reflectometry analyzer 142 provides a fingerprint (Fingerprint C-F) for the optical link from node 140 to node 170.

Signature and path analysis module 114 receives a request to provide a data path between nodes 120 and 170. Signature and path analysis module 114 determines a path that includes node 140. Here, signature and path analysis module 114 may utilize network usage information to determine the path from node 120 through node 140 to node 170, or the path may be provided as a dedicated path to the service of a particular need, such as a client dedicated path, a flow-based dedicated path, a service-level agreement (SLA) based dedicated path, a datacenter-to-datacenter dedicated path, or another dedicated path as needed or desired. Once the path is selected, signature and path analysis module 114 operates to direct SDN controller 116 to establish the network switching such that all data transmissions targeted to the dedicated path are switched in accordance with the path.

Signature and path analysis module 114 then operates to retrieve the most recent fingerprints for the selected optical links (i.e., Fingerprint A-C and Fingerprint C-F) from fingerprint database 112 and defines a path signature that combines the fingerprints. Thus the signature for the dedicated path between node 120 and node 170 includes Fingerprint A-C and Fingerprint C-F. It will be understood that the reverse path can be similarly validated with reflectometry analyzer 172 providing a fingerprint (e.g., Fingerprint F-C, not illustrated), and reflectometry analyzer 142 providing a fingerprint (e.g., Fingerprint C-A, not illustrated), as needed or desired. However, if the forward and reverse data is transmitted on a common optical link, such as where the data transmission is provided as time domain multiplexing communications over a common fiber optic cable, the reverse path fingerprints may need to be separately determined from the forward path fingerprints. In any case, the continuous reflectometry analysis of the optical links by reflectometry analyzers 122, 142, and 172 will be provided to fingerprint database 112.

Figure 3:
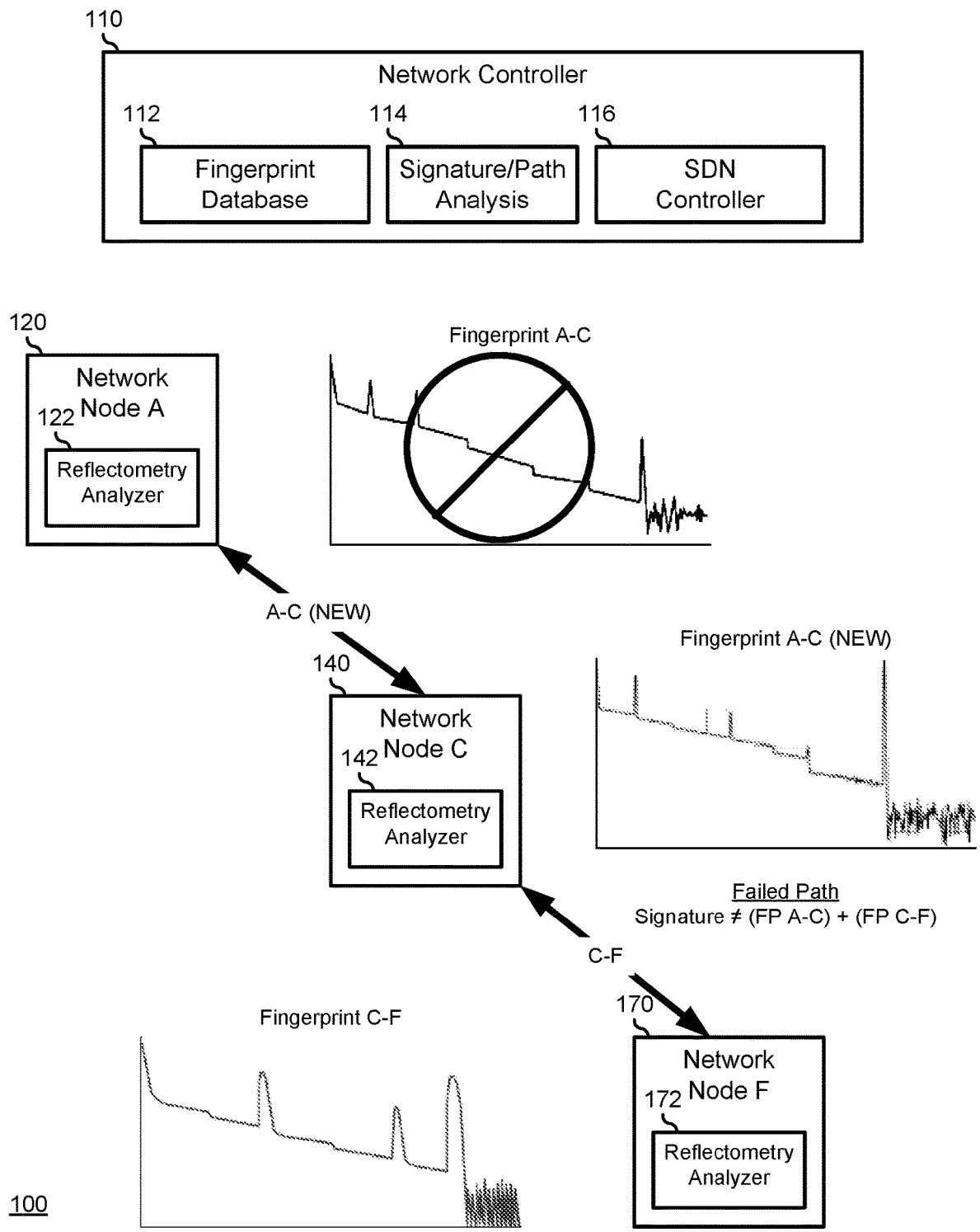

Signature and path analysis module 114 operates to continuously validate that the selected path has not been physically altered in any way, such as by reconfiguring the switching functions of network nodes 120, 130, 140, 150, 160, and 170, or by changing the physical connection of optical fibers to a port of the nodes. For example, in FIG. 3, reflectometry analyzer 122 detects a new fingerprint (Fingerprint A-C(NEW)) on the optical link between node 120 and node 140, and provides the new fingerprint to fingerprint database 112. Upon receiving the new fingerprint at fingerprint database 112, signature and path analysis module 114 analyzes the new fingerprint and determines that it is different from the prior fingerprint for the optical link between node 120 and node 140, and that thus the signature for the entire path between node 120 and node 170 has changed.

In the normal course of operation, the fingerprints for the optical links of all-photonics network 100 will experience a degree of drift over time, resulting from environmental changes in the optical links (temperature, pressure, strain, etc.), aging of the optical links, and the like. Here, signature and path analysis module 114 operates to determine if a change in a fingerprint for the optical links are within expected norms, and are thus not indicative of tampering or changing of the optical links or switching paths, or are of such a character or degree as to indicate that the optical links or switching paths have been tampered with. In a particular embodiment, signature and path analysis module 114 includes a machine learning algorithm that operates to characterize changes in the fingerprints as to whether or not the changes are within the expected norms. An example of a machine learning algorithm may include a linear regression algorithm, a logistic regression algorithm, a decision tree algorithm, a support vector machine algorithm, a naïve Bayes algorithm, a k-nearest neighbor algorithm, a k-means algorithm, a random forest algorithm, a dimensionality reduction algorithm, a gradient boosting algorithm, or the like.

Upon determining that a change in a fingerprint for the optical links is of such a character or degree as to indicate that the optical link or switching path has been tampered with, signature and path analysis module 114 operates to flag the path as having failed the validation. Here, signal and path analysis module 114 may operate to generate an error indication that can be provided to a error management system for all-photonics network 100 that can provide a work ticket for a network administrator to physically verify the interconnections between the nodes and the optical links, or to take other actions to isolate and repair the path. Network controller 110 acts to halt the data flows over the failed path to ensure that the data flows are not in any way compromised and remain secure, and acts to validate a new path as needed or desired. Here, the establishment and maintenance of the path may be provided in accordance with a service level agreement (SLA) with the user of the path, and so there may be contractual obligations to ensure a level of security for the data flows.

Here, a complete halt of such data flows may be more desirable than the potential of a security breach, and so signature and path analysis module 114 may perform a complete shutdown of such flows over the compromised path until an alternative path can be validated. Finally signature and path analysis module 114 operates to establish and validate a new path for the data flows between the desired nodes. Here, where fingerprint database 112 includes the fingerprints for all of the optical links, the establishment and validation of a new path may be a simple matter of analyzing new path options, selecting the new path, and directing SDN controller 116 to establish the new path. However, where a new path can not be created with the existing data in fingerprint database 112, signature and path analysis module 114 may direct reflectometry analyzers 122, 132, 142, 152, 162, and 172 to analyze new optical links to determine a new path, as needed or desired.

Figure 4:
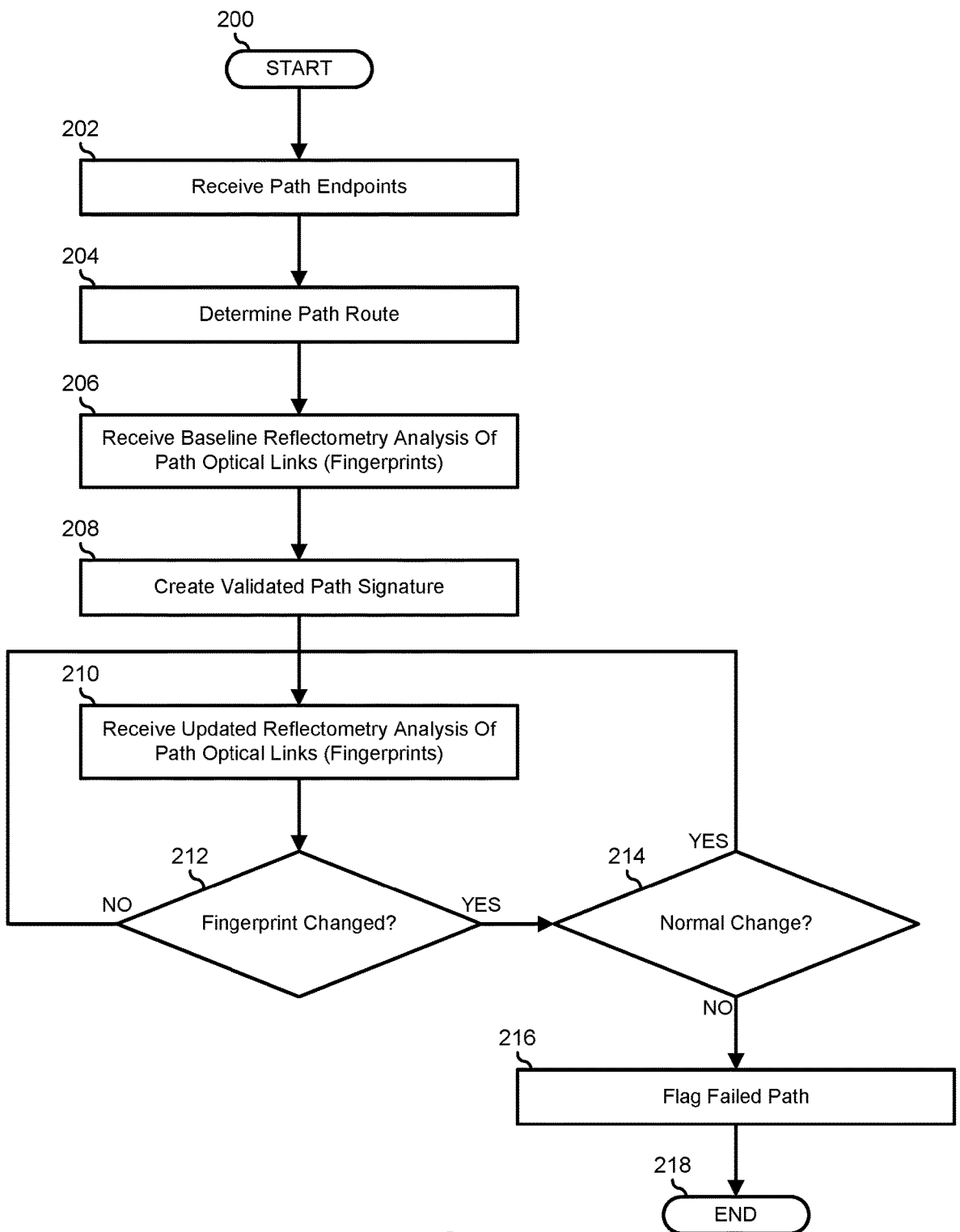
FIG. 4 is a flow chart illustrating a method for establishing a secure and attested all-photonics network according to an embodiment of the current disclosure.

FIG. 4 illustrates a method for establishing a secure and attested all-photonics network starting at block 200. The endpoint nodes for establishing a secure path are received in block 202, and a best path between the endpoint nodes is determined in block 204. Reflectometry analyzers associated with the optical links in the path provide the fingerprints for their respective paths in block 206, and a signature for the path made up of the individual fingerprints is created in block 210. Updated fingerprints are continuously received from the reflectometry analyzers in block 208. A decision is made as to whether or not any of the fingerprints have changed in decision block 212.

If not, the "NO" branch of decision block 212 is taken and the method returns to block 210 where the update fingerprints continue to be received. If any of the fingerprints have changed, the "YES" branch of decision block 212 is taken and a decision is made as to whether the changed fingerprints are within expected norms in decision block 214. If so, the "YES" branch of decision block 214 is taken and the method returns to block 210 where the update fingerprints continue to be received. If the changed fingerprints are not within expected norms, the "NO" branch of decision block 214 is taken, the path is flagged as having failed attestation in block 216, and the method ends in block 218.

Figure 5:
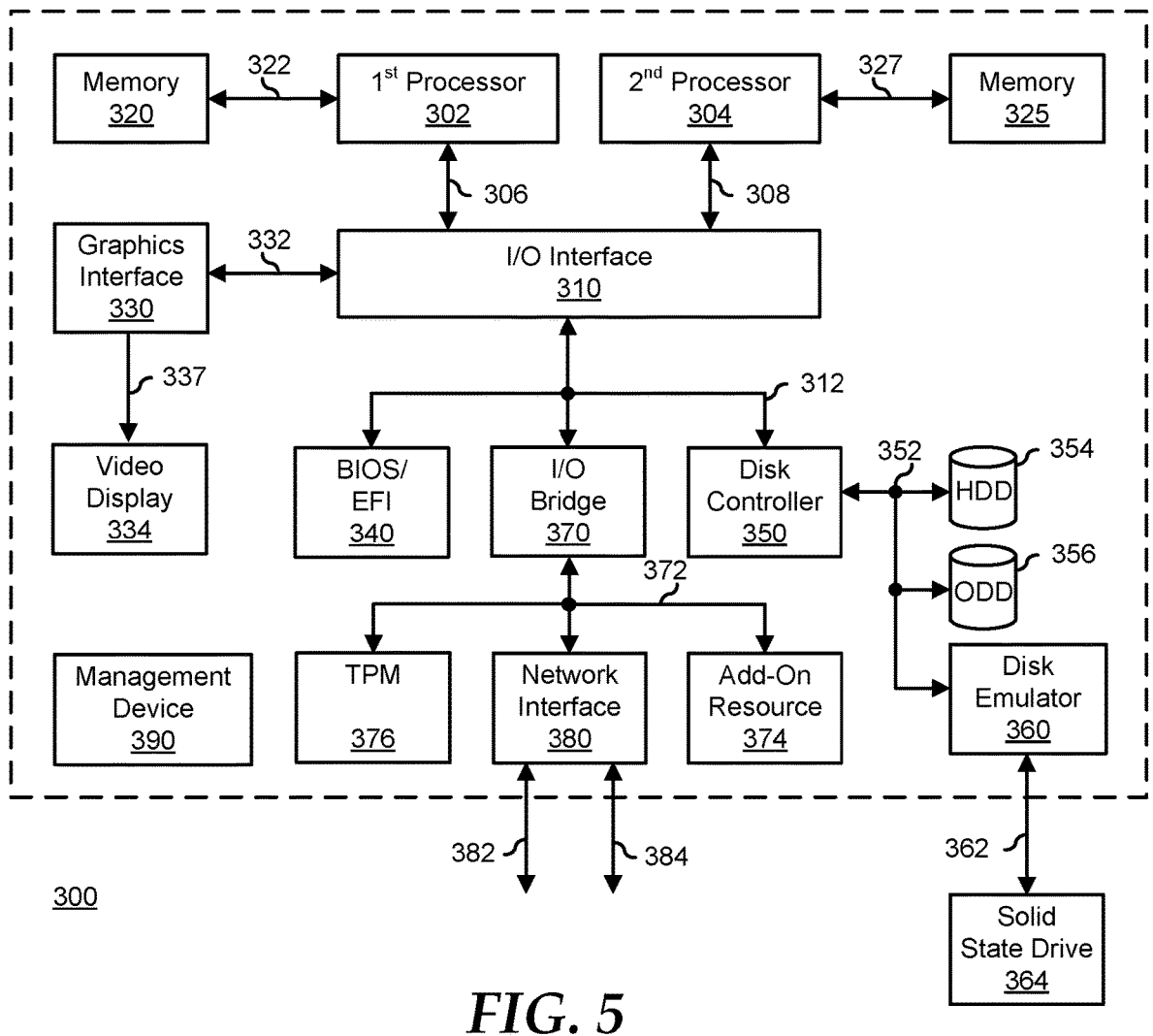
FIG. 5 is a block diagram illustrating a generalized information handling system according to another embodiment of the current disclosure.

FIG. 5 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data communication network, comprising:
    a plurality of network nodes coupled together via optical links, each network node including a reflectometry analyzer configured to provide a characterization of physical properties of the optical links coupled to the associated network node, wherein for each optical link the characterization by the associated reflectometry analyzer provides a unique fingerprint of the physical properties of the particular optical link; and
    a network controller configured to:
        determine a network path between a first network node and a second network node, wherein the network path traverses a first optical link;
        receive a first fingerprint for the first optical link from a first reflectometry analyzer;
        define a signature for the path, the signature including the first fingerprint;
        receive a second fingerprint for the first optical link from the first reflectometry analyzer, the second fingerprint being different from the first fingerprint; and
        determine that the network path is not secure based upon the difference between the first fingerprint and the second fingerprint.
2. The data communication network of claim 1, wherein the network path further traverses a second optical link.

3. The data communication network of claim 2, wherein the network controller is further configured to:
    receive a third fingerprint for the second optical link from a second reflectometry analyzer, wherein the signature further includes the third fingerprint.
4. The data communication network of claim 1, wherein in determining that the network path is not secure, the network controller is further configured to determine that a difference between the first fingerprint and the second fingerprint indicates that a second optical link has been substituted for the first optical link in the path.
5. The data communication network of claim 1, wherein the network controller is further configured to:
    set a network routing table of the first network node based upon the path in response to determining the path.
6. The data communication network of claim 1, wherein the network controller is further configured to:
    determine that the network path is secure based upon the difference between the first fingerprint and the second fingerprint.
7. The data communication network of claim 6, wherein in determining that the network path is secure, the network controller is further configured to determine that a difference between the first fingerprint and the second fingerprint indicates that a particular physical property of the first optical link has changed.
8. The data communication network of claim 1, wherein the reflectometry analyzers include at least one of an optical time domain reflectometry instrument and an optical frequency domain reflectometry instrument.
9. The data communication network of claim 1, wherein for each optical link, the physical properties include at least one of a temperature, a pressure, a strain, and a location of a discontinuity in the optical link.
10. The data communication network of claim 1, wherein the optical links include at least one of a single mode fiber optic cable and a multi-mode fiber optic cable.
11. A method, comprising:
    providing, in a data communication network, a plurality of network nodes coupled together via optical links, each network node including a reflectometry analyzer configured to provide a characterization of physical properties of the optical links coupled to the associated network node, wherein for each optical link the characterization by the associated reflectometry analyzer provides a unique fingerprint of the physical properties of the particular optical link; and
    determining, by a network controller of the data communication network, a network path between a first network node and a second network node, wherein the network path traverses a first optical link;
    receiving a first fingerprint for the first optical link from a first reflectometry analyzer;
    defining a signature for the path, the signature including the first fingerprint;
    receiving a second fingerprint for the first optical link from the first reflectometry analyzer, the second fingerprint being different from the first fingerprint; and
    determining that the network path is not secure based upon the difference between the first fingerprint and the second fingerprint.
12. The method of claim 11, wherein the network path further traverses a second optical link.
13. The method of claim 12, further comprising:
    receiving a third fingerprint for the second optical link from a second reflectometry analyzer, wherein the signature further includes the third fingerprint.

14. The method of claim 11, wherein in determining that the network path is not secure, the method further comprises;
  determining that a difference between the first fingerprint and the second fingerprint indicates that a second optical link has been substituted for the first optical link in the path.

15. The method of claim 11, further comprising:
  setting a network routing table of the first network node based upon the path in response to determining the path.

16. The method of claim 11, further comprising:
  determining that the network path is secure based upon the difference between the first fingerprint and the second fingerprint.

17. The method of claim 16, wherein in determining that the network path is secure, the method further comprises:
  determining that a difference between the first fingerprint and the second fingerprint indicates that a particular physical property of the first optical link has changed.

18. The method of claim 11, wherein the reflectometry analyzers include at least one of an optical time domain reflectometry instrument and an optical frequency domain reflectometry instrument.

19. The data communication network of claim 1, wherein for each optical link, the physical properties include at least one of a temperature, a pressure, a strain, and a location of a discontinuity in the optical link.

20. A data communication network, comprising:
  a plurality of network nodes coupled together via optical links, each network node including a reflectometry analyzer configured to provide a characterization of physical properties of the optical links coupled to the associated network node, wherein for each particular optical link, the characterization by the associated reflectometry analyzer provides a unique fingerprint of the physical properties of the particular optical link; and
  a network controller configured to:
    determine a network path between a first network node and a second network node, wherein the network path traverses a first optical link and a second optical link;
    receive a first fingerprint for the first optical link from a first reflectometry analyzer and a second fingerprint for the second optical link from a second reflectometry analyzer;
    define a signature for the path, the signature including the first fingerprint and the second fingerprint;
    receive a third fingerprint for the first optical link from the first reflectometry analyzer, the third fingerprint being different from the first fingerprint;
    determine that a difference between the first fingerprint and the third fingerprint indicates that a third optical link has been substituted for the first optical link in the path;
    determine that the network path is not secure in response to determining that the third optical link has been substituted for the first optical link in the path;
    determine that the difference between the first fingerprint and the third fingerprint indicates that a particular physical property of the first optical link has changed; and
    determine that the network path is secure based upon the determination that the particular physical property of the first optical link has changed.

* * * * *